US010795140B2

(12) United States Patent
Schoenle et al.

(10) Patent No.: US 10,795,140 B2
(45) Date of Patent: Oct. 6, 2020

(54) METHOD, DEVICE AND LASER SCANNING MICROSCOPE FOR GENERATING RASTERIZED IMAGES

(71) Applicant: Abberior Instruments GmbH, Goettingen (DE)

(72) Inventors: Andreas Schoenle, Goettingen (DE); Lars Kastrup, Goettingen (DE)

(73) Assignee: ABBERIOR INSTRUMENTS GMBH, Goettingen (DE)

( * ) Notice: Subject to any disclaimer, the term of this patent is extended or adjusted under 35 U.S.C. 154(b) by 542 days.

(21) Appl. No.: 15/437,770

(22) Filed: Feb. 21, 2017

(65) Prior Publication Data

US 2017/0248778 A1 Aug. 31, 2017

(30) Foreign Application Priority Data

Feb. 25, 2016 (DE) .................. 10 2016 103 382

(51) Int. Cl.
*G02B 21/00* (2006.01)
*G01N 21/64* (2006.01)
*H04N 5/225* (2006.01)

(52) U.S. Cl.
CPC ....... *G02B 21/008* (2013.01); *G01N 21/6458* (2013.01); *G02B 21/00* (2013.01); *G02B 21/0032* (2013.01); *G02B 21/0076* (2013.01); *G02B 21/0084* (2013.01); *H04N 5/2256* (2013.01)

(58) Field of Classification Search
None
See application file for complete search history.

(56) References Cited

U.S. PATENT DOCUMENTS

| 5,705,821 | A | * | 1/1998 | Barton | G01B 11/20 250/458.1 |
| 6,108,446 | A | * | 8/2000 | Hoshen | G06K 9/6218 382/203 |
| 6,248,988 | B1 | * | 6/2001 | Krantz | G02B 21/004 250/201.3 |
| 7,902,523 | B2 | * | 3/2011 | Motomura | G01N 21/6458 250/458.1 |
| 8,912,511 | B2 | * | 12/2014 | Schoenborn | A61B 5/0059 250/459.1 |
| 2004/0159773 | A1 | * | 8/2004 | Fein | G01N 21/6458 250/208.1 |

(Continued)

FOREIGN PATENT DOCUMENTS

DE 10 2011 051 086 A1 12/2012
WO 2005/115005 12/2005

*Primary Examiner* — Gelek W Topgyal
(74) *Attorney, Agent, or Firm* — Thomas | Horstemeyer, LLP

(57) ABSTRACT

In order to generate rasterized images of a sample, a pixel size of image points of a rasterized image is set and photons emitted out of the sample which were detected, and for each of which a position of an effective local excitation of the sample for emitting the respective detected photon has been recorded are assigned to that image point of the rasterized image into which the position of the effective local excitation recorded for the respective detected photon falls. To set the pixel size of the image points to an optimized pixel size, the positions of the effective local excitation of the sample for emitting the detected photons are evaluated.

20 Claims, 4 Drawing Sheets

(56) References Cited

U.S. PATENT DOCUMENTS

| | | | |
|---|---|---|---|
| 2004/0227822 A1* | 11/2004 | Cartlidge | G01N 21/6458 |
| | | | 348/207.99 |
| 2008/0290293 A1* | 11/2008 | Motomura | G01N 21/6458 |
| | | | 250/458.1 |
| 2010/0213389 A1 | 8/2010 | Larkin et al. | |
| 2012/0201463 A1* | 8/2012 | Suzuki | G01J 3/10 |
| | | | 382/192 |
| 2013/0032713 A1* | 2/2013 | Barbi | H01J 37/26 |
| | | | 250/307 |
| 2014/0097358 A1 | 4/2014 | Hell et al. | |
| 2014/0125776 A1 | 5/2014 | Damaskinos et al. | |
| 2014/0160266 A1* | 6/2014 | Wereley | G02B 21/365 |
| | | | 348/79 |

* cited by examiner

METHOD, DEVICE AND LASER SCANNING MICROSCOPE FOR GENERATING RASTERIZED IMAGES

CROSS REFERENCE TO RELATED APPLICATIONS

This application claims priority to co-pending German Patent Application No. DE 10 2016 103 382.0 filed Feb. 25, 2016.

FIELD

The present disclosure relates to a method of generating rasterized images of a sample with the following steps: Setting a pixel size of image points of a rasterized image and assigning photons emitted out of the sample which were detected and for each of which a position of an effective local excitation of the sample for emitting the particular detected photon has been recorded to that particular image point of the rasterized image into which the position of the effective local excitation recorded for the particular photon falls.

The present disclosure also relates to a device for executing such a method and to a laser scanning microscope with such a device.

The pixel size gives the size of a two-dimensional or three-dimensional segment of the sample for which a relative number of emitted and detected photons shows up in the rasterized image of the sample with a single, consistent value, especially a single, consistent value of the image brightness.

The pixel size of a rasterized image of a sample determines the spatial resolution with which the sample is depicted in the image. Structures of the sample which are smaller than twice the pixel size are not fully resolved in the rasterized image. The farther the size of the structures falls below the value of twice the pixel size, the more the structures blur until finally they cannot be resolved anymore. Conversely, the smaller the pixel size is chosen, the higher the danger is that a rasterized image gets overwhelmed by noise. This is the case because the number of photons assigned to each of neighboring image points suffers statistical fluctuations on the order of the root of the mean of the number of photons detected per image point. These statistical fluctuations grow to a high percentage for small numbers of photons detected per image point. Due to the noise, the contrast in an image is lost.

BACKGROUND

A method of imaging of a structure tinted with a fluorescent dye in a sample is known from DE 10 2011 051 086 A1, corresponding to US 2014/0097358 A1, in which the sample in a scanning region is repeatedly scanned using a light intensity distribution localized around a focus point of a focused excitation light beam. The scanning conditions are chosen such that the fluorescence light is emitted from the scanning region in the form of photons that are individually detectable. When these photons are detected, they are each assigned to the position of the focus point at the respective point in time. An image of the structure is put together from the positions which were assigned to the detected photons during the course of several repetitions of the scanning of the scanning region. In addition to the excitation light beam, the light intensity distribution can include a focused stimulation light beam that, with regard to its wavefronts, is aberrated, the stimulation light intensity distribution of which has a zero point at the focus point of the excitation light beam. In this way, the position of the effective excitation of the sample for emitting the photons by stimulated emission is narrowed. This means that the method is a method of high-resolution STED (Stimulated Emission Depletion) laser scanning microscopy.

In a practical application of the method known from DE 10 2011 051 086 A1, the positions of the effective excitation of the sample for emitting the detected photons are assigned to image points of a rasterized image with a pixel size set in advance. This pixel size set in advance depends on the narrowing of the position of the effective excitation of the sample with the aid of the stimulating light beam, i.e., it depends on the spatial resolution of the STED method.

Generally, in laser scanning microscopy the pixel size of rasterized images of a sample scanned with a localized light intensity distribution is set in advance to half the spatial resolution of the respective microscopy method.

There is still a need to improve the quality of a rasterized image generated by assigning photons emitted out of a sample to that particular image point of the rasterized image into which the position of the effective local excitation recorded for the particular photon falls.

SUMMARY

The invention provides a method of generating rasterized images of a sample. According to the method, a pixel size of image points of a rasterized image is set. The sample is locally excited for emitting photons at a position of an effective local excitation. The sample is scanned with the position of the effective local excitation. The photons emitted out of the sample are detected. The position of the effective local excitation of the sample is registered for each detected photon; and the photons are assigned to that particular image point of the rasterized image into which the position of the effective local excitation recorded for the particular detected photon falls. The positions of the effective local excitation of the sample for emitting the detected photons are evaluated to set the pixel size of the image points to an optimized pixel size.

The invention also provides an apparatus for generating rasterized images of a sample. The apparatus comprises a data input for data relating to positions of an effective local excitation of the sample for emitting particular detected photons, a data output configured to output image data of rasterized images, and a data processing unit arranged between the data input and the data output. The data processing unit is configured to execute the following steps: setting a pixel size of image points of a rasterized image, assigning photons which were emitted from the sample, which were detected and for which a position of an effective local excitation of the sample for emitting the particular detected photon was recorded to that particular image point of the rasterized image into which the position of the effective local excitation recorded for the particular detected photon falls, and evaluating the positions of the effective local excitation of the sample for emitting the detected photons to set the pixel size of the image points to an optimized pixel size.

The invention also provides a laser scanning microscope for generating rasterized images of a sample. The laser scanning microscope comprises an emission excitation light source configured to provide an emission excitation light beam of emission excitation light, an emission inhibition light source configured to provide an emission inhibition light beam of emission inhibition light, an objective configured to focus the emission excitation light beam from the emission excitation light source and the emission inhibition light beam from the emission inhibition light source into a focus region in the sample, wherein an intensity minimum of the emission inhibition light surrounded by intensity maxima of the emission inhibition light and spatially coinciding with an intensity maximum of emission excitation light is formed in the sample, a scanning device configured to scan the sample with the emission inhibition light intensity minimum, a detector configured to detect photons emitted out of the sample, a device configured to, for every photon detected by the detector, record a position of the effective local excitation of the sample for emitting the respective detected photon in the region of the emission inhibition light intensity minimum, and an apparatus for generating rasterized images of a sample. The apparatus for generating rasterized images of a sample comprises a data input for data relating to the positions of the effective local excitation of the sample for emitting a particular detected photon, a data output configured to output image data of the rasterized images, and a data processing unit arranged between the data input and the data output. The a data processing unit is configured to execute the following steps: setting a pixel size of image points of a rasterized image, assigning photons emitted from the sample which were detected, and for which a position of an effective local excitation of the sample for emitting the particular detected photon was recorded to that particular image point of the rasterized image into which the position of the effective local excitation recorded for the particular detected photon falls, and evaluating the positions of the effective local excitation of the sample for emitting the detected photons to set the pixel size of the image points to an optimized pixel size.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
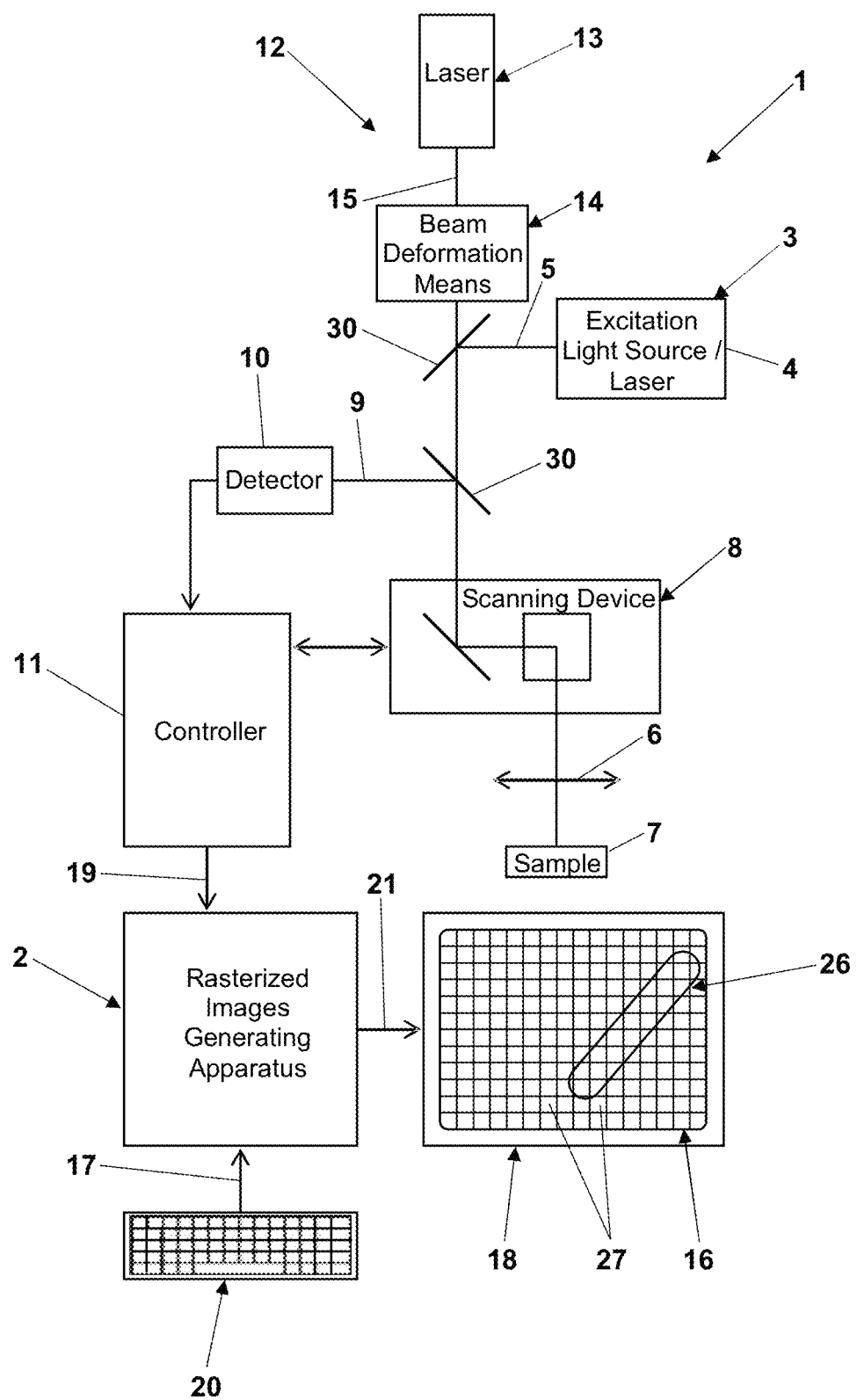
FIG. 1 schematically shows a laser scanning microscope with an apparatus for carrying out the method according to the present disclosure.

In a method of generating rasterized images of a sample according to the invention, for setting a pixel size of image points of a rasterized image to an optimized pixel size—at which photons emitted from the sample that were detected and for which a position of an effective local excitation of the sample for emitting the particular detected photon was each recorded are assigned to the respective image point of the rasterized image into which the position of the effective local excitation recorded for the respective photon falls—the positions of the effective local excitation of the sample for emitting the detected photons are evaluated.

In the method according to the invention, the pixel size of the image points of the rasterized image therefore is set dependent on the distribution of the positions of the effective local excitation of the sample for emitting the detected photons. In the method according to the invention, therefore not only the spatial resolution at which the effective local excitation of the sample for emitting the detected photons is achieved has an effect on the pixel size set for the rasterized image, but also the sample itself has an effect in the form of the photons emitted by it. The set pixel size is optimized with regard to this distribution. In this regard "optimized pixel size" generally means that pixel size for which the rasterized image visualizes the information contained in the distribution of the positions of the effective local excitation of the sample for emitting the detected photons as well as possible. In other words, the rasterized image with the optimized pixel size ideally shows the complete information contained in this distribution, but no artifacts and as little noise as possible.

The invention is based on the realization that in many cases the aims mentioned cannot be reached with a preset pixel size, but only with a pixel size adjusted or adapted to the actual distribution of the positions of the effective local excitation of the sample registered for the detected photons. This adjustment can be automatized, so that rasterized images with optimized pixel size are obtained dependently and reproducibly.

Specifically, the evaluation of the positions of the effective local excitation of the sample for emitting the detected photons may comprise the steps of setting a preliminary pixel size of image points of a preliminary rasterized image, assigning the photons to the particular image point of the preliminary rasterized image into which the position of the effective local excitation recorded for the specific detected photon falls, and evaluating the preliminary rasterized image generated in this way. The preliminary pixel size set for the generation of the preliminary rasterized image is preferably chosen to be smaller than an expected optimal pixel size of the image finally rasterized. Specifically, the preliminary pixel size can be set to be 10%, 20% or 50% smaller than an expected optimal pixel size.

Evaluating the preliminary rasterized image is done with the aim of capturing the information contained in the distribution of the positions of the effective local excitation of the sample for emitting the detected photons pertaining to the structures of the sample and the spatial resolution of these structures reached in the localized excitation of the sample for emitting the photons. This makes clear that, in the method according to the invention, the set pixel size is dependent on the structures of the sample to be imaged to a high degree and therefore is not only dependent on the resolution of the local excitation of the sample for emitting the detected photons.

The evaluation of the preliminary rasterized image to obtain the mentioned information can comprise image processing of the preliminary rasterized image such as for example an image deconvolution. The image processing may comprise the entire preliminary rasterized image or only a part of it. The image processing can also be adjusted to different parts of the preliminary rasterized image in different ways. Specifically, a local deconvolution of the preliminary rasterized image may be done.

The evaluation of the preliminary rasterized image with a view to optimizing the pixel size may comprise determining dimensions of minimal structures in the preliminary rasterized image. The optimized pixel size or a further preliminary pixel size then may be set as a function of the dimensions of theses minimal structures. Specifically, the optimized pixel size or a further preliminary pixel size may be set to half the size of these minimal structures according to the Nyquist criterion. Subsequently, the final rasterized image with the pixel size optimized in this way is generated or first another preliminary rasterized image with another preliminary pixel size is generated to optimize the pixel size further. Such an iteration can be done over a set number of e.g. two, three or five iterative steps or it may be terminated when no more changes to the preliminary pixel size exceeding the limiting value result.

Instead of evaluating the preliminary rasterized image in position space and looking for minimal structures there, the evaluation can also be made in frequency space in which a search is made for the highest spatial frequencies of the preliminary rasterized image. Then, the optimized pixel size and a further preliminary pixel size is set as a function of the highest spatial frequency. Using the Nyquist criterion, the optimized or further preliminary pixel size can be set to half the reciprocal value of the highest spatial frequency. Here, too, the setting of the optimized pixel size may involve an iteration over a set number of iteration steps or using a termination criterion. During the iteration, the pixel size can also be optimized alternatingly using the minimal structures and the highest spatial frequencies in the preliminary rasterized images.

The steps of evaluating the positions of the effective local excitation of the sample for emitting the detected photons to set the pixel size of the image points to an optimized pixel size and of assigning of the photons to the image points of the rasterized image in the inventive method can at least partially occur already while the sample is locally excited for emitting the photons, the photons emitted from the sample are detected and the positions of the effective local excitation of the sample are recorded for the detected photons. That means that the method according to the invention may already be done in parallel to recording the distribution of the positions of the effective local excitation of the sample for emitting the detected photons.

The positions of the effective local excitation of the sample for emitting the photons can be evaluated one after the other as they are recorded. The pixel size of the image points can then be set consecutively to the pixel size optimized for the positions evaluated as yet. It is understood that with every change of the pixel size occurring in this way the step of assigning the positions of the effective local excitation of the sample for emitting the photons to the individual image points must be made anew. There is a tendency for the optimized pixel size to decrease with an increasing number of positions of the effective local excitation of the sample for emitting the photons because with an increasing number of detected photons the photons can be spread over more image points without the rasterized image suffering noise as a consequence.

In the method according to the invention, the positions of the effective local excitation of the sample for emitting the individual detected photons can be determined using different pieces of information. They can for example be determined using an intended position of a scanning device with which the sample is scanned with a localized light intensity distribution. They may also be determined using a measured actual position of such a scanning device, an absolute point in time of the detection of the individual photon or a relative point in time of the detection of the individual photons with regard to a reference point in time. The reference point in time for the relative point in time of the detection can be chosen from a beginning or an end of a scanning process and a previous or subsequent pulse of an emission excitation light source or an emission inhibition light source. A conclusion on the actual position of the scanning device can be made from the point in time of the detection of the individual photon. Depending on the kind of the scanning device and how it is controlled, a linear or a non-linear relation can be present between the point in time and the actual position.

As it has already been suggested above, in the method according to the invention, the pixel size can be set to different optimized pixel sizes for different regions of the rasterized image, wherein each optimized pixel size is optimized for the particular region of the rasterized image. If, for example, a region of the rasterized image corresponds to a region of the sample from which only a few photons are emitted because for example only very few molecules marked with a fluorescent dye are located there, to avoid strong noise alone it makes sense to set the pixel size to be larger than for regions with many detected photons. Different structures with different dimensions or spatial frequencies placed in different regions of the sample can also result in different optimized pixel sizes.

In a preferred embodiment of the method according to the invention, an angle between a direction of extension of the image points of the rasterized image and a scanning direction in which the positions of the effective local excitation of the sample for emitting the detected photons follow one another is optimized. This optimization is advantageous even independently of the optimization of the pixel size according to the invention—i.e., even in combination with an unchangeable pixel size or independently of the actual positions of the effective local excitation of the sample for emitting the detected photons. The optimization can have different aims, wherein these aims may be separate or cumulative. One of these aims may be that a main direction of extension of a structure in the sample that is in the focus of interest is parallel to one of the directions of extension of the image points so that this structure fills well in the rasterized image or at least a part of the rasterized image. At least one of the directions of extension of the image points of the rasterized image may also be chosen expressly in such a way that it extends in the direction of the minimal structures or the highest spatial frequencies of the rasterized image or a preliminary image.

In the method according to the invention, the optimized pixel size frequently will be of the same size in all directions of extension of the image points, i.e. in both directions of extension of the image points of a two-dimensional image or in the three directions of extension of the image points of a three-dimensional image. Differing pixel sizes in the different directions of extension, however, can make sense. This is, for example, the case if a pixel size in a z-direction of an image is intentionally set to be larger than those in the x- and y-directions of the rasterized image because the requirements for a resolution in imaging the sample as high as that in the x- and y-direction are not given for the z-direction.

Furthermore, the optimized pixel size can be set in non-cartesian coordinates. This means that every image point of the rasterized image does not have to correspond to a region of the sample with rectangular dimensions but the regions of the sample can for example be limited by surfaces of which two each are parallel but with the pairs of surfaces being arranged under angles different than 90° with respect to each other. Furthermore, the optimized pixel size can be set in hexagonal or cylindrical coordinates to account for e.g. a special geometry of a structure of interest in the particular sample.

In addition to the information that can be derived from the positions of the effective local excitation of the sample for emitting the detected photons, the optimized pixel size can also be set with regard to further information and/or boundary conditions. The further information and/or the boundary conditions can for example comprise a zoom factor of the imaging of the sample into the rasterized image or a pixelization of a monitor for showing the rasterized image. Furthermore, the resulting total number of pixels of the rasterized image can be limited to powers of two, or the optimized pixel size can be limited to such pixel sizes for which a total number of pixels of the rasterized image that is a power of two results. This is advantageous if a convolution of the rasterized image is to take place as image processing.

An apparatus for generating rasterized images of a sample according to the invention comprises a data input for data pertaining to positions of an effective local excitation of the sample for emitting a detected photon, a data output for outputting image data of rasterized images and a data processing unit arranged between the data input and the data output for carrying out the method according to the invention.

A laser scanning microscope according to the invention for generating rasterized images of a sample in addition to the apparatus according to the invention comprises an emission excitation light source, an emission inhibition light source, and an objective for focusing an emission excitation light beam from the emission excitation light source and an emission inhibition light beam from the emission inhibition light source into a focus region in the sample, where in the sample an emission inhibition light intensity minimum surrounded by emission inhibition light intensity maxima is generated which spatially coincides with an emission excitation light intensity maximum. The laser scanning microscope also comprises a scanning device for scanning the sample with the emission inhibition light intensity minimum, a detector for detecting the photons emitted from the sample and a device which records a position of the effective local excitation of the sample for emitting the respective detected photon in the region of the emission inhibition light intensity minimum for each photon detected by the detector. Apart from the apparatus according to the invention, the laser scanning microscope according to the invention can correspond to a known laser scanning microscope which records the position of the effective local excitation of the sample for emitting the respective detected photon for individual photons emitted from the sample and outputs this position. According to the invention, such a laser scanning microscope for generating rasterized images is upgraded for generating rasterized images with an optimized pixel size by adding the apparatus according to the invention.

Now referring in greater detail to the drawings, FIG. 1 illustrates a laser scanning microscope 1 that, in addition to the typical components of a conventional laser scanning microscope 1, comprises an apparatus 2 for carrying out the method according to the present disclosure for generating rasterized images with an optimized pixel size. The laser scanning microscope 1 comprises an emission excitation light source 3. The emission excitation light source 3 comprises a laser 4 that provides an emission excitation light beam 5. By an objective 6, the emission excitation light beam 5 is focused into a sample 7 to be imaged with the laser scanning microscope 1. With the scanning device 8, the focused emission excitation light beam 5 is moved relative to the sample 7 to scan the sample 7 with the focused emission excitation light beam 5. With the focused emission excitation light beam 5, a fluorescent dye in the sample is locally excited for the emission of fluorescence light 9 which is detected with a detector 10. A controller 11 of the laser scanning microscope 1 assigns the photons of the fluorescence light beam 9 detected with the detector 10 to the position of the local excitation of the sample 7 with the emission excitation light beam 5 dependent on the position that the scanning device 8 takes up at the moment. This position of the current local excitation of the sample 7 has as a lower limit of the Abbe diffraction limit if only the emission excitation light beam 5 is used. The laser scanning microscope 1, however, is realized as an STED microscope and has an additional emission inhibition light source 12. The emission inhibition light source 12 comprises a laser 13 and beam deformation means 14 which form an emission inhibition light beam 15 provided by the laser 13 in such a way with respect to its wavefronts and/or its polarization that in the place where the focused emission excitation light beam 5 forms an emission excitation light intensity maximum in the sample 7 an emission inhibition light intensity minimum in the sample 7 is formed which is surrounded by emission inhibition light intensity maxima. In the region of these emission inhibition light intensity maxima, the emission of fluorescence light 9 is inhibited by the excited molecules of the fluorescent dye being de-excited by stimulated emission. In this way, the detector 10 only detects fluorescence light 9 from the region of the emission inhibition light intensity minimum. The dimensions of the emission inhibition light intensity minimum can be decreased far below the diffraction limit by increasing the intensity of the emission inhibition light beam 15. In this way, the spatial resolution of the laser scanning microscope 1 is increased. The yield of photons of the fluorescence light 9, however, decreases and the exact spatial resolution with which the laser scanning microscope 1 resolves structures marked with the fluorescent dye in the sample 7 depends on a number of parameters. The distribution of photons of the fluorescence light 9 onto a rasterized image 16 of the sample 7 therefore is non-trivial. It has especially been shown not to make sense to set a fixed pixel size, i.e. a size of the two-dimensional or three-dimensional segments of the sample 7 for which the photons of the fluorescence light 9 are collected. Rather, in the laser scanning microscope 1 according to the present disclosure data 19 are passed to the apparatus 2 by the controller 11 which give the positions of the effective local excitation of the sample 7 for emission of the individual detected photons of the fluorescence light 9 derived from the position of the scanning device 8. Then, these data 19 together with a given value 17 for a preliminary pixel size are used to generate the rasterized image 16 with an optimized pixel size and display it on a display 18. The given value 17 for the preliminary pixel size originates from an input device 20, which may, for example, be a keyboard. The display 18 is provided with image data 21 for the rasterized image 16 with the optimized pixel size by the apparatus 2.

Figure 2:
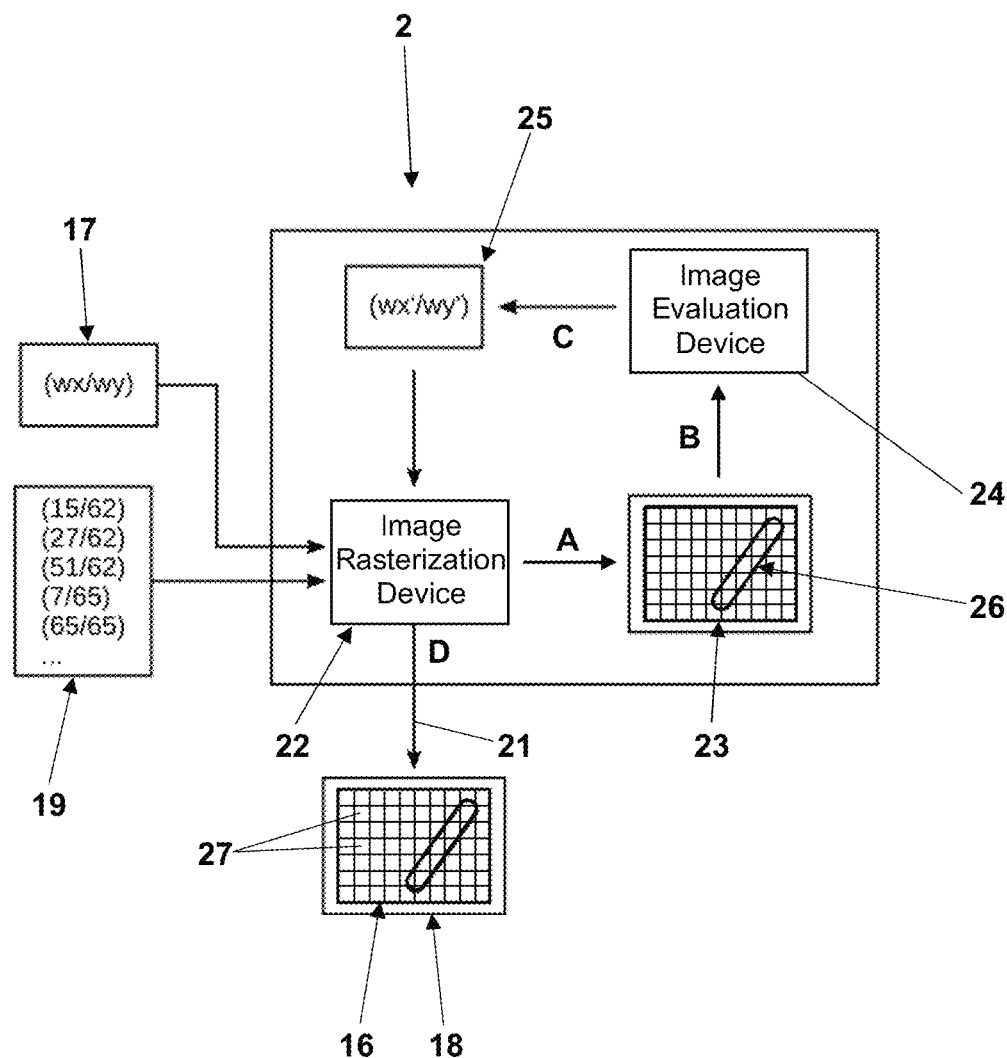
FIG. 2 is a block diagram pertaining to the apparatus according to FIG. 1 and the method according to the present disclosure to be carried out with the latter.

FIG. 2 is a sketch of the apparatus 2 according to FIG. 1 and the method according to the present disclosure carried out by the apparatus 2. From the given value 17 for the preliminary pixel size and the data 19 for the positions of the effective excitation of the sample 7 for emitting the detected photons of the fluorescence light 9, by an image rasterization device 22 a preliminary rasterized image 23 is generated in a step A. This preliminary rasterized image 23 in a step B is fed to an image evaluation device 24 and evaluated by the image evaluation device 24. In a step C the image evaluation device 24 sets a modified pixel size 25 as a result of its evaluation. This modified pixel size 25 then is used together with the data 19 in the image rasterization device 22 to output the rasterized image 16 with the pixel size that is already optimized in a step D. The steps A to C may also, for example, be repeated iteratively until the modified pixel size 25 does not substantially change anymore. The modified pixel size 25 can deviate from the given value 17 not only with respect to the size of the segments of the sample for which the photons of the fluorescence light 9 are sampled but also with regard to the orientation of these segments and the coordinates in which they are given.

Figure 3:
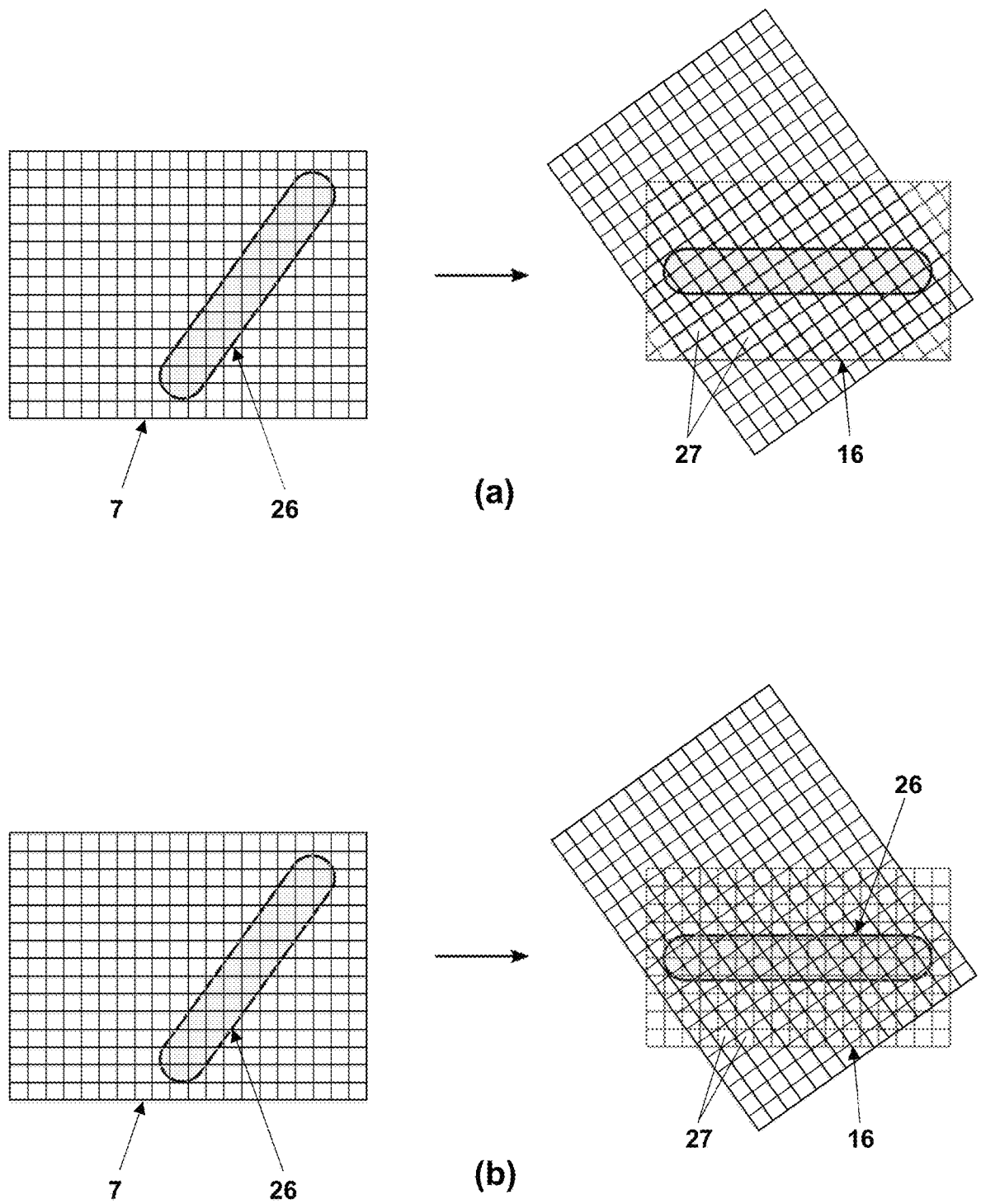
FIG. 3 explains an optimizing of a direction of extension of image points in the method according to the present disclosure.

FIG. 3(a) illustrates how a structure 26 in the sample 7 or the photons emitted by molecules of fluorescent dye with which the structure 26 is marked are assigned to different image points 27 of a rasterized image 16 if though the image 16 or the part of the image being regarded being adapted to the orientation of the structure 26 a direction of extension of the image points 27 of the rasterized image still corresponds to a scanning direction in which the positions of the effective excitation of the sample 7 for emitting fluorescence light are arranged in a sequence following each other. FIG. 3(b), on the other hand, illustrates the case in which the direction of extension of the image points 27 of the rasterized image 16 is optimized in addition to the size of the image points 27 in that the image points 27 now extend along or transverse to the main direction of the structure 26.

Figure 4:
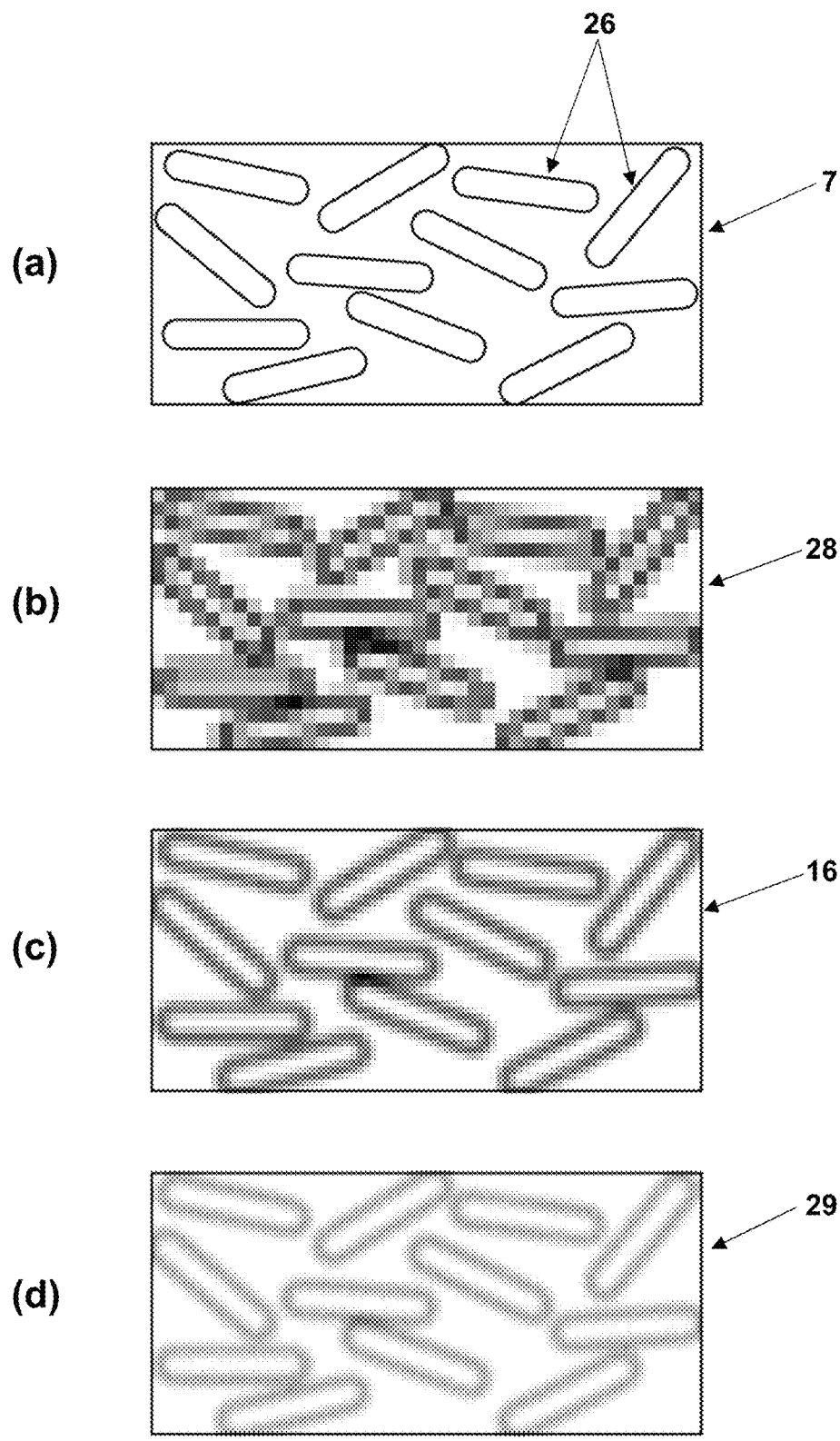
FIG. 4 shows different rasterized images of a sample with exemplary structures.

FIG. 4(a) shows exemplary structures 26 in a sample 7. FIG. 4(b) shows a rasterized image 28 of the sample 7 with the pixel size chosen too large, i.e. a rasterization that is too coarse. The structures 26 in this image 28 rasterized too coarsely cannot be discerned in an optimal way. FIG. 4(c) shows a rasterized image 16 generated according to the present disclosure with an optimized pixel size. The structures 26 can be discerned in it as well as this is possible due to the photons of the fluorescence light 9 they contain. The contrast of the rasterized image 16 is lower than the contrast of the too coarsely rasterized image 28, which however is more than compensated for by the increase in resolution. FIG. 4(d) shows a rasterized image 29 with the pixel size chosen too small, i.e. a rasterization that is too fine. The structures 26 already suffer from noise. The loss of contrast that is even stronger here is no longer compensated by an increased spatial resolution. With the method according to the present disclosure, the image 16 with the optimized pixel size is automatically obtained.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of generating rasterized images of a sample, comprising the steps:

locally exciting the sample for emitting photons at a position of an effective local excitation;
scanning the sample with the position of the effective local excitation;
detecting the photons emitted out of the sample;
prior to performing rasterization, recording the respective position of the effective local excitation of the sample for each of the detected photons;
prior to performing rasterization, evaluating the recorded positions of the effective local excitation of the sample for emitting the detected photons and, based at least in part on the recorded positions, setting a pixel size of image points of an image to be rasterized to an optimized pixel size; and
during rasterization, assigning each detected photons to a respective image point of an image being rasterized into which the respective position of the effective local excitation recorded for the particular detected photon falls.

2. The method according to claim 1, wherein the step of evaluating the positions of the effective local excitation of the sample for emitting the detected photons to set a pixel size of image points of an image to be rasterized to an optimized pixel size comprises the steps:

setting a preliminary pixel size of image points of a preliminary rasterized image,
assigning the photons to that particular image point of the preliminary rasterized image into which the position of the effective local excitation recorded for the particular detected photon falls, and
evaluating the preliminary rasterized image.

3. The method according to claim 2, wherein the preliminary pixel size is set to be at least 10% smaller than an expected optimal pixel size.

4. The method according to claim 3, wherein the preliminary pixel size is set to be at least 20% smaller than an expected optimal pixel size.

5. The method according to claim 4, wherein the preliminary pixel size is set to be at least 50% smaller than an expected optimal pixel size.

6. The method according to claim 3, wherein
the evaluation of the preliminary rasterized image comprises determining dimensions of minimal structures in the preliminary rasterized image; and
the optimized pixel size or a further preliminary pixel size is set as a function of the dimensions of the minimal structures.

7. The method according to claim 3, wherein
evaluating the preliminary rasterized image comprises determining of maximal spatial frequencies of the preliminary rasterized image; and
the optimized pixel size or a further preliminary pixel size is set as a function of the maximal spatial frequencies.

8. The method according to claim 1, wherein the steps of evaluating the positions of the effective local excitation of the sample for emitting the detected photons to set the pixel size of the image points to an optimized pixel size, and of assigning the detected photons to the image points of the rasterized image are at least partially done while the sample is locally excited for emitting the photons, the photons emitted from the sample are detected, and the positions of the effective local excitation of the sample for emitting the particular detected photons are recorded.

9. The method according to claim 1, wherein the positions of the effective local excitation of the sample for emitting the photons are evaluated one after the other, and that the pixel size of the image points is subsequently set to the pixel size optimized for the previously evaluated positions.

10. The method according to claim 1, wherein the position of the effective local excitation of the sample for emitting the particular detected photon is determined using at least one of the following pieces of information:

a desired position of a scanning device;
a measured actual position of the scanning device;

an absolute point in time of the detection of the particular photon;

a relative point in time of the detection of the particular photon with respect to a reference point in time chosen from a beginning or an end of a scanning process and a previous or subsequent pulse of an emission excitation light source or an emission inhibition light source.

11. The method according to claim 1, wherein the pixel size is set to different optimized pixel sizes for different regions of the rasterized image, where each optimized pixel size is optimized for the respective region of the rasterized image.

12. The method according to claim 1, wherein pixel size is set to different optimal pixel sizes for different directions of extension of the rasterized image.

13. The method according to claim 1, wherein an angle between a direction of extension of the image points of the rasterized image and a scanning direction in which the positions of the effective local excitation of the sample for emitting the detected photons are arranged following each other is optimized.

14. The method according to claim 1, wherein the optimized pixel size is set in non-cartesian coordinates.

15. The method according to claim 14, wherein the optimized pixel size is set in hexagonal or cylindrical coordinates.

16. The method according to claim 1, wherein the optimized pixel size is set considering at least one of further information and boundary conditions.

17. The method according to claim 1, wherein the optimized pixel size is set such as to result in total pixel numbers that are powers of two.

18. An apparatus for generating rasterized images of a sample comprising a data input for data relating to positions of an effective local excitation of the sample for emitting particular detected photons, a data output configured to output image data of rasterized images, and a data processing unit arranged between the data input and the data output, and configured to execute the following steps:
  prior to performing rasterization, recording the respective position of the effective local excitation of the sample for each of the detected photons;
  prior to performing rasterization, evaluating the recorded positions of the effective local excitation of the sample for emitting the detected photons and, based at least in part on the recorded positions, setting a pixel size of image points of a rasterized image to an optimized pixel size,
  during rasterization, assigning photons,
    which were emitted from the sample,
    which were detected, and
    for which a position of an effective local excitation of the sample for emitting the particular detected photon was recorded, and
  to that respective image point of the optimized pixel size of the rasterized image into which the respective position of the effective local excitation recorded for the particular detected photon falls.

19. A laser scanning microscope for generating rasterized images of a sample, comprising the apparatus of claim 18.

20. A laser scanning microscope for generating rasterized images of a sample, comprising an apparatus to perform the steps of the method of claim 1.

* * * * *